United States Patent [19]

Coker

[11] 3,897,586
[45] July 29, 1975

[54] POLYMER COATED PIGMENT PARTICLES AND A PROCESS FOR THEIR PREPARATION

[75] Inventor: James Newton Coker, Wilmington, Del.

[73] Assignee: E. I. du Pont de Nemours & Co., Wilmington, Del.

[22] Filed: Aug. 4, 1972

[21] Appl. No.: 277,883

Related U.S. Application Data

[63] Continuation of Ser. No. 61,480, Aug. 5, 1970, abandoned.

[52] U.S. Cl. ............... 428/403; 427/221; 428/404; 428/407
[51] Int. Cl.² ........................................... B32B 5/16
[58] Field of Search ...... 117/100 B, 100 S, 161 UB, 117/161 UC, 161 UF, 161 UH

[56] References Cited
UNITED STATES PATENTS

| | | |
|---|---|---|
| 2,876,133 | 3/1959 | Iler et al. ............................. 117/100 |
| 3,068,185 | 12/1962 | Stamberger .......................... 117/100 |
| 3,083,118 | 3/1963 | Bridgeford ........................... 117/100 |
| 3,503,785 | 3/1970 | Kruse .................................. 117/100 |
| 3,519,593 | 7/1970 | Bolger ................................. 117/100 |
| 3,635,752 | 1/1972 | Baer et al. ............................ 117/100 |
| 3,661,620 | 5/1972 | Dekking et al. ............... 117/161 UB |

*Primary Examiner*—William D. Martin
*Assistant Examiner*—Dennis C. Konopacki

[57] ABSTRACT

The deposition of polymers as thin coatings on finely divided pigment particles is accomplished by polymerizing at least one ethylenically unsaturated monomer precursor in the presence of the pigment particles without the presence of a surface-active agent. The process is made feasible through the use of a reaction medium capable of dissolving the monomer reactants but incapable of dissolving the derived polymer. A variety of coated products are prepared indicating the general nature of the process both from the standpoint of type of polymer which can be deposited and also the type of inorganic substrate which can be used.

14 Claims, No Drawings

POLYMER COATED PIGMENT PARTICLES AND A PROCESS FOR THEIR PREPARATION

CROSS-REFERENCE TO RELATED APPLICATION

This is a continuation of application Ser. No. 61,480, filed Aug. 5, 1970, now abandoned.

BACKGROUND OF THE INVENTION

1. Field of Invention

This invention relates to processes for applying a polymer coating to finely divided inorganic particles and the products resulting from these processes.

2. Description of the Prior Art

Known methods of coating or encapsulating powders with polymers involve suspending the material to be coated in a solution of the coating polymer; the addition of a nonsolvent to the mixture then causes deposition of the coating. The preparation of very finely divided products normally cannot be accomplished using this method due to the fact that tacky intermediates, which are very prone to agglomerate, are produced. This problem can be minimized somewhat, but not eliminated, by agitating the reaction mixture at a high shear rate during the precipitation. An alternate approach, operable only with certain types of clay, utilizes the chemical reactivity of the surface of the clay particles to graft on a water-soluble azo initiator. Vinyl monomers are then polymerized in the presence of these activated particles, yielding compositions in which substantial amounts of polymer have been grafted to the particles.

Dutch Pat. Nos. 6,608,071 and 6,608,072 disclose a method of coating particles by pretreating the particles with the polymer. The polymer is adsorbed onto the particles, and then a chain-like component is attached to the adsorbed polymer. The chain-like component is then solvated by the addition of a hydrocarbon solvent providing a stabilizing shell around the polymer particles. Monomers are then added and polymerized on the stabilized particles.

Canadian Pat. No. 603,430 teaches a method of coating a particle with a polymer in an aqueous medium. However, the particle must be stabilized against agglomeration or cementation into larger agglomerates by adding a surface active agent to the polymerization medium.

British Pat. No. 1,005,434 discloses still another approach wherein a pigment is thoroughly wetted with a vinyl monomer. The particles are then dispersed in a liquid medium and the monomers polymerized.

French Pat. No. 1,341,733 teaches a method of coating particles with block or graft copolymers. However, the polarity of the polymerization medium must be modified to deposit the copolymer on the particle.

Employing the method disclosed herein, finely divided inorganic particles can be coated by means of solution polymerization of monomer(s) in situ onto the particles without pretreatment of the particles, without the need for dispersing agents and without modification of polymerization medium polarity.

SUMMARY OF THE INVENTION

According to this invention, there is provided a process for coating finely divided hydrophilic inorganic particles with a polymer by suspending the particles in a non-aqueous liquid reaction medium without the presence of a surface-active agent, and adding at least one ethylenically unsaturated monomer and a free-radical initiator to the medium in order to polymerize the monomer in situ onto the particles, in an amount of at least about 0.5 weight percent polymer loading, wherein the reaction medium is a solvent for the monomer and initiator, and a non-solvent for the polymer. The process does not require the use of a stabilizer (polymeric dispersant) of the type disclosed in the above-mentioned patents, pretreatment of the particles to be coated with the polymer or modification of the polymerization medium polarity.

This invention also provides for polymer-coated inorganic particles manufactured by the process described. The exact nature of product formed by the novel process of this invention has not as yet been determined. Applicant, therefore, does not wish to be limited to any particular structure, except that it does not require the presence of a polymeric subcoating as in the case of the products disclosed in Dutch Pat. No. 6,608,072.

The polymer coated particles produced by this invention are useful in pigmented polymer compositions, for example, in the type known as latex paints. In latex paint technology, small pigment particle size is desirable, and intimate contact between the pigment particles and emulsion binder is required. Coating the small pigment particles with the binder used in the latex paint system, and subsequently dispersing the polymer coated pigment in the latex paint system yields a more uniform paint product.

DESCRIPTION OF THE PREFERRED EMBODIMENTS

The process herein described has been developed for depositing a variety of polymers as discreet coatings on the surface of finely divided pigment particles. The process was found to be generally operable with hydrophilic inorganic powders and pastes. Its operability depends on the use of a reaction medium which is capable of dissolving the monomer precursor(s) and the polymerization initiator, but which acts as a non-solvent for the polymer to be coated. Aliphatic hydrocarbons are especially suitable as reaction media. The presence of a surface-active agent in the reaction medium is not required.

The process is carried out by first suspending in the reaction medium the finely divided material to be coated. Monomer and initiator are then added, preferably simultaneously, in an amount end at a rate sufficient to avoid excessive concentrations of monomer in the reaction medium. The polymer formed is deposited as a coating on the individual substrate particles, the individual particle size of the latter being largely maintained until a 10–25 weight percent polymer loading is reached. As used herein, weight percent polymer loading is defined as the weight of polymer deposited on the particle divided by the weight of polymer deposited plus the weight of the pigment particle. After 3–6 weight percent polymer loading is attained, the substrate particles take on the chemical and physical properties of the polymer coating. A variety of polymer-coated products can be prepared. A unique feature of the described process is that it yields fully dispersed and deflocculated fine particle dispersions after only 0.5–1.0 weight percent polymer loading has been obtained. Polymer coating of the particle continues without the aid of any external additive, such as a polymeric dispersing agent.

The rate of addition of the monomer and initiator is important in order to avoid excessive concentrations of monomer in the reaction medium. Excessive concentrations of the monomer tend to cause the polymer to agglomerate on the particle being coated, and a large proportion of such coating is readily removed in a single pass through a Morehouse stone mill. Consequently, the reactants should be added at a rate, e.g., which approximates the rate of polymerization, sufficient to substantially fully polymerize the monomer. When coated in this manner, the finely divided individually coated particles remain fully coated after 25–30 passes through a Morehouse stone mill.

While titanium dioxide is preferred as the substrate, other inorganic powders and pastes in general are readily coatable. For example, various polymer coatings can be deposited on clay, such as commercially available coating clays, other metal oxides such as antimony oxide, zinc oxide, acicular pigments such as acicular rutile, mullite, and fibrous asbestos, and other substrates such as colloidal silica, aluminum paste, and zinc chromate. This process is particularly useful for coating single particles having a size of 0.1 micron or less where this small particle size is fully retained; however, the process is also useful for coating particles of larger size, e.g., 100 microns or more.

Any material that acts as a solvent for the monomer and, at least to a limited extent, for the initiator, and as a nonsolvent for the polymer, should be suitable as a reaction medium. Preferred reaction mediums are the aliphatic hydrocarbons. More preferred are the straight chain aliphatic hydrocarbons and most preferred are the non-polar, straight chain aliphatic hydrocarbons, e.g., hexane and heptane. Petroleum naphtha is also preferred. Cyclohexane and toluene are less preferred. While these latter two materials exhibit lower chain transfer activity than the straight chain hydrocarbons, they tend to be better solvents for certain types of polymers. Mixtures of solvents may also be used.

Any commercially available free-radical initiator which is soluble in the reaction medium should be satisfactory as a polymerization initiator. The term "free-radical initiator" is intended to include the free-radical compound and any active breakdown product thereof. Organic peroxides including peresters and percarbonates and commonly used azo compounds are most satisfactory. Preferred initiators are $\alpha, \alpha'$-azobisisobutyronitrile and t-butyl-peroxypivalate, while others are dilauroyl peroxide, benzyl peroxide, ditertiary butyl peroxide, tertiary butyl peracetate and other compounds of comparable free-radical activity. The concentration of the free-radical initiator is maintained at 1–4 weight percent of the amount of monomer(s) introduced.

A number of different polymerizable ethylenically unsaturated monomers can be used singly and in mixtures as precursor(s) of polymer coatings. The polymer coatings may be homopolymers, copolymers or mixtures of homopolymers and/or copolymers. Suitable monomers include vinyl monomers such as acrylics (acrylates and methacrylates) such as alkyl acrylates and methacrylates, e.g., methyl methacrylate, ethylhexylacrylate, ethyl acrylate, and ethylene glycol dimethylacrylate; vinyl esters such as vinyl acetate and vinyl propionate; vinyl aromatics such as o-methyl styrene, p-chloro styrene and styrene; and vinyl or vinylidene halides such as vinyl chloride and vinylidene chloride. Also operable are acidic vinyl monomers such as acrylic acid or methacrylic acid and basic monomers such as N,N-diethylaminoethyl acrylate or N,N-dimethylaminoethyl methacrylate. Either of the latter two types can be used in mixtures with one or more monomers such as vinyl acetate and acrylic acid, methyl methacrylate, ethyl acrylate, and methacrylic acid. The type of monomer suitable for use in the process is not restricted to those containing highly polar functionality (e.g., carboxyl, amine, hydroxyl groups).

The monomers are polymerized under standard conditions for making solution polymers. The conditions which should be employed for the monomer precursor(s) will be obvious to one having ordinary skill in the art.

The amount of polymer loading that is necessary in order for the substrate to take on the properties of the coating polymer varies depending upon the substrate and polymer used. Ordinarily, a 3–6 percent polymer loading is sufficient to impart the coating polymer's properties to the substrate. However, even lower amounts may be satisfactory. For example, when titanium dioxide is coated with a polymer such as polyethylacrylate or polymethylmethacrylate, a polymer loading of 1.5–2.0 percent is sufficient to transform the titanium dioxide from a hydrophilic substance to one that is completely hydrophobic.

The fine particle size of the substrate is easily retained without agglomeration when the substrate is coated with a 3–6 percent polymer loading. However, above this level, the degree of polymer hardness will determine whether some agglomeration will occur. For example, with soft polymers such as polyethylacrylate, there is evidence that some agglomeration begins to occur above a polymer loading of about 6 percent. With moderately hard polymers such as polyvinyl acetate, loadings of 12–15 percent can be obtained before appreciable particle agglomeration occurs. And with hard polymers such as polymethyl methacrylate, relatively finely divided powders containing as much as 60–80 percent polymer loading can be prepared.

The change in properties due to build up of a given polymer coating is conferred uniformly on the substrate particles. Evidence of the high order of coating-substrate is provided by the fact that repeated grinding in a Morehouse stone mill of a variety of coated products fails to alter appreciably the physical and chemical properties of these products. For example, the hydrophobic character is fully retained by all of a given sample after the grinding.

An important utility provided by the coating process under discussion is that it yields a given substrate in finely divided form to which have been imparted the chemical and physical properties of the coating polymer. Accordingly, the chemical and physical properties of the coated substrate will vary in accordance with the properties of the particular coating polymer employed. Following is a discussion of the various properties that are imparted to a titania substrate through the use of various coating polymers.

Polyacrylic acid-coated titania gives typical carboxylic acid reactions such as reaction with ammonia and amines. Likewise, poly(N,N-diethylaminoethylacrylate)-coated titania gives typical base reactions. Mixing finely divided suspensions of each of these products causes immediate flocculation. Either of the products can be converted by neutralization with simple acids or bases into highly water dispersible forms of titanium dioxide.

Titania coated with a vinyl acetate/acrylic acid copolymer exhibits variable hydrophobic-hydrophilic character, depending on the concentration of the carboxyl group present in the coating. A coating consisting of 95 parts of vinyl acetate to 5 parts acrylic acid makes the coated pigment particle hydrophobic, but with the tendency to migrate to the methylene chloride side of a water-methylene chloride interface when aqueous ammonia is added to the mixture. A coating of 80 parts vinyl acetate to 20 parts acrylic acid yields a hydrophobic product, but on addition of aqueous ammonia it migrates completely to the aqueous phase. Acidification of the mixture with acetic acid causes the pigment to move back into the methylene-chloride phase. Deposition on titania of a copolymer of 50 parts vinyl acetate to 50 parts acrylic acid yields a material which is permanently hydrophilic, but with a tendency to migrate to the water side of the water-methylene chloride interface when acetic acid is added to the mixture. The 80/20 weight ratio vinyl acetate/acrylic acid coated product neutralized with a fugitive base such as ammonia is temporarily dispersible in water.

Titania coated with either polyethylacrylate or polymethylmethacrylate, both water-resistant polymers, becomes very hydrophobic in character at relatively low polymer loadings such as 1.5–2.0 weight percent. By coating titania with polyvinyl acetate, a more water sensitive polymer, loadings of about 4.5–7 weight percent are necessary to obtain a comparable level of hydrophobicity. The acrylate-coated product is soft and, when rubbed on a rough porous substrate, tends to adhere to the substrate, whereas the methacrylate-coated material is hard and nonadhering under the same conditions.

The following examples, in which parts and percentages are by weight unless otherwise specified, illustrate the present invention in more detail.

EXAMPLE 1

The process for coating finely divided inorganic powders can be illustrated by the following example:

In 100 parts of heptane were suspended with vigorous agitation 35 parts of rutile titania. The mixture was heated with agitation to 80°–85°C. and held at this temperature. Five (5) parts of methyl methacrylate and 0.2 part of $\alpha$, $\alpha'$-azobisisobutyronitrile initiator dissolved in 5 parts of heptane were added simultaneously over a period of 1.25 hours. Heating and stirring was then continued for an additional 1 to 2 hours. The product was then allowed to settle and the excess solvent removed by decantation. The resulting slurry was then vacuum dried and the product isolated as a very finely divided white powder which contained 10 wt.% coated poly(methyl methacrylate). It was completely hydrophobic, retaining this characteristic after 30 passes through a Morehouse stone mill. Examination of the product under an optical microscope showed the presence of relatively uniform spheres exhibiting diameters of $0.5\mu$ or less. No evidence of agglomeration of the particles was detected.

EXAMPLES 2 to 15

The results set forth in Table I indicate the variety of experiments conducted in accordance with the procedure of Example 1. The amount of polymer deposited is a function of the amount of monomer(s) and initiator introduced into the batch and the reaction time, and ascertainment of the amount to be deposited will be obvious to one having ordinary skill in the art.

TABLE I

| Example No. | Substrate(g) | Monomer(s) (g) | Initiator(g) | Medium(g) | Polymer-Coated Pigments | | | |
|---|---|---|---|---|---|---|---|---|
| | | | | | Time (hr.) | Temp. (°C.) | Microscopic Appearance | Polymer Deposited (%)* |
| 2 | $TiO_2$(15) | Methyl Methacrylate (15) | Azo(0.2)** | Hexane(100) | 2.0 | 69 | — | 32.9 |
| 3 | Product from 2 | Methyl Methacrylate (15) | Azo(0.2)** | Hexane(100) | 1.0 | 69 | — | 58.5 |
| 4 | Product from 3 | Methyl Methacrylate (30) | Azo(0.4)** | Hexane(100) | 1.0 | 69 | 5–10$\mu$ (uniformly pigmented) | 77.9 |
| 5 | $TiO_2$(15) | Vinyl Acetate(3) | Azo(0.1) | Hexane(50) | 1.0 | 69 | 0.5$\mu$ or less | 3.0 |
| 6 | $TiO_2$(15) | Vinyl Acetate(15) | Peroxide (0.15)*** | Hexane(60) | 2.0 | 69 | 0.5$\mu$ or less with aggregates to 1.5$\mu$ | 16.1 |
| 7 | $TiO_2$(100) | Ethyl Acrylate(10) | Azo(0.3)** | Hexane(300) | 2.0 | 69 | 0.5$\mu$ or less | 1.38 |
| 8 | $TiO_2$(100) | Vinylidene Chloride(25) | Azo(0.3)** | Hexane(300) | 1.5 | 69 | 0.5$\mu$ or less | 0.97 |
| 9 | $TiO_2$(100) | Vinylidene Chloride(25) | Peroxide (0.2)** | Hexane(300) | 2.0 | 69 | 0.5$\mu$ or less | 4.70 |
| 10 | Colloidal silica | Methyl Methacrylate (30) | Peroxide (0.05)*** | Cyclohexane (200) | 3.0 | 81 | 1–2$\mu$ (transparent spherical particle) | 76.4 |
| 11 | $TiO_2$(1000) | Methyl Methacrylate (60) 2-Ethylhexyl Acrylate(60) Methacrylic Acid (30) | Azo(1.0)** | Hexane(2000) | 4.0 | 69 | 0.5$\mu$ or less | 8.9 |
| 12 | $TiO_2$(1000) | Vinyl Acetate(120) Acrylic Acid(30) | Peroxide (0.3)*** | Hexane(2000) | 4.0 | 69 | — | 4.9 |
| 13 | $ZnCrO_4$(530) | Methyl Methacrylate (49) Ethyl Acrylate(23) Methacrylic Acid(8) | Azo(0.55)** | Hexane(1500) | 4.0 | 69 | — | 2.7 |

TABLE I – Continued

| Example No. | Substrate(g) | Monomer(s) (g) | Initiator(g) | Medium(g) | Polymer-Coated Pigments | | | |
|---|---|---|---|---|---|---|---|---|
| | | | | | Time (hr.) | Temp. (°C.) | Microscopic Appearance | Polymer Deposited (%)* |
| 14 | Clay(910) | Methyl Methacrylate (75) 2-Ethylhexyl Acrylate (68) Methacrylic Acid (7.5) | Azo(1.0)** | Hexane(3500) | 4.0 | 69 | wide scatter (0.5–5µ) of irregular transparent particle | 8.9 |
| 15 | Sb$_2$O$_3$(500) | Vinyl Acetate (60) Acrylic Acid (15) | Peroxide*** (0.3) | Hexane(1500) | 4.0 | 69 | most: 0.5µ or less fes: to 1–2µ | 9.4 |

*Wt. polymer/(wt. polymer + wt. particle)
**α,α'-azobisisobutyronitrile
***t-butyl-peroxypivalate

EXAMPLE 16

An inorganic paste was coated as follows:

In 100 parts of petroleum naphtha having a boiling point between about 88°–142°C. and 1 part benzyl peroxide were suspended with agitation 100 parts of aluminum paste. The mixture was heated with agitation to 104°–108°C. and held at this temperature. Twenty-nine parts of methyl methacrylate and 1 part of ethylene glycol dimethacrylate were added over a period of about 1 hour. Heating was continued for about an additional 0.5 hour. One-hundred parts of Cellosolve acetate (ethylene glycol monoethyl ether acetate) were added and the reaction mixture distilled until 163 parts were distilled-off. The product contained 17 weight percent polymer coating. The weight percent polymer coating was determined by diluting flake with acetone, centrifuging and measuring weight loss.

What is claimed is:

1. A process for preparing polymer-coated finely divided inorganic particles which comprises suspending finely divided hydrophilic inorganic particles selected from the group consisting of metal oxides, clay, colloidal silica, and zinc chromate in a non-aqueous liquid reaction medium selected from the group consisting of aliphatic hydrocarbons and cyclohexane without the presence of a surface-active agent, adding polymerizable ethylenically unsaturated monomer selected from the group consisting of acrylic esters, methacrylic esters, vinyl esters, vinyl halides, vinylidene halides, acrylic acid, and methacrylic acid and a free-radical initiator to the medium at a rate which approximates the rate of polymerization, and polymerizing the monomer in situ onto the particles until a polymer loading of at least about 0.5 weight percent is reached, said liquid reaction medium being a solvent for the monomer and initiator and a non-solvent for the polymer formed as a coating on the particles.

2. The process of claim 1 wherein the finely divided hydrophilic inorganic particles are acicular pigments.

3. The process of claim 1 wherein the finely divided hydrophilic inorganic particles are metal oxides selected from the group consisting of titanium dioxide, antimony oxide and zinc oxide.

4. The process of claim 1 wherein the liquid reaction medium is a straight chain aliphatic hydrocarbon.

5. The process of claim 1 wherein the liquid reaction medium is hexane or heptane.

6. The process of claim 5 wherein said monomer is methyl methacrylate, ethylene glycol dimethacrylate, ethylhexyl acrylate, ethyl acrylate, vinyl acetate, vinyl chloride, vinylidene chloride, acrylic acid or methacrylic acid.

7. The process of claim 6 wherein the free-radical initiator is an organic peroxide or azo compound.

8. The process of claim 7 wherein the free-radical initiator is α,α'-azobisisobutyronitrile, benzyl peroxide or t-butyl peroxypivalate.

9. The process of claim 8 wherein said monomer is a mixture of methyl methacrylate, ethyl acrylate, and methacrylic acid.

10. The process of claim 1 wherein the liquid reaction medium is an aliphatic hydrocarbon, the free-radical initiator is selected from the group consisting of organic peroxides and azo compounds, and the monomer is polymerized onto the particles until a polymer loading of from about 1.5 to 80 weight percent is reached.

11. The process of claim 10 wherein said liquid reaction medium is a non-polar straight chain aliphatic hydrocarbon and said monomer is polymerized onto the particles until a polymer loading of at least about 3 weight percent is reached.

12. The process of claim 11 wherein said aliphatic hydrocarbon is hexane or heptane and said ethylenically unsaturated monomer is methyl methacrylate, ethylhexyl acrylate, ethyl acrylate, ethylene glycol dimethacrylate, vinyl acetate, vinyl chloride, vinylidene chloride, acrylic acid or methacrylic acid.

13. The product prepared by the process of claim 1.

14. The product prepared by the process of claim 12.

* * * * *